(12) United States Patent
Tokizaki

(10) Patent No.: US 12,057,140 B2
(45) Date of Patent: *Aug. 6, 2024

(54) DISK DEVICE WITH DAMPER ATTACHED TO ARM OF ACTUATOR ASSEMBLY

(71) Applicants: Kabushiki Kaisha Toshiba, Tokyo (JP); Toshiba Electronic Devices & Storage Corporation, Tokyo (JP)

(72) Inventor: Tomoyuki Tokizaki, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/207,334

(22) Filed: Jun. 8, 2023

(65) Prior Publication Data

US 2023/0317112 A1    Oct. 5, 2023

Related U.S. Application Data

(63) Continuation of application No. 17/716,596, filed on Apr. 8, 2022, now Pat. No. 11,710,507, which is a continuation of application No. 17/180,533, filed on Feb. 19, 2021, now Pat. No. 11,341,997.

(30) Foreign Application Priority Data

Sep. 16, 2020   (JP) ................... 2020-155669

(51) Int. Cl.
  *G11B 19/20*   (2006.01)
  *G11B 5/48*    (2006.01)

(52) U.S. Cl.
  CPC ........ *G11B 19/2018* (2013.01); *G11B 5/4813* (2013.01)

(58) Field of Classification Search
  None
  See application file for complete search history.

(56) References Cited

U.S. PATENT DOCUMENTS

| | | |
|---|---|---|
| 4,544,972 A | 10/1985 | Kogure et al. |
| 5,905,608 A | 5/1999 | Frees et al. |
| 7,016,157 B1 | 3/2006 | Williams et al. |
| 7,352,537 B2 | 4/2008 | Dominguez et al. |
| 7,636,222 B1 | 12/2009 | Dobosz et al. |
| 7,859,795 B2 | 12/2010 | Kerner et al. |
| 7,929,254 B2 | 4/2011 | Soga et al. |

(Continued)

FOREIGN PATENT DOCUMENTS

| | | |
|---|---|---|
| CN | 101211564 A | 7/2008 |
| JP | 2002-100128 A | 4/2002 |

(Continued)

*Primary Examiner* — William J Klimowicz
(74) *Attorney, Agent, or Firm* — Kim & Stewart LLP

(57) ABSTRACT

According to one embodiment, a disk device includes a plurality of recording media each including a recording layer and an actuator assembly including an actuator block rotatably supported around a rotation shaft, a plurality of arms extending from the actuator block, and suspension assemblies respectively attached to the arms and supporting respective magnetic heads. Of the plurality of arms, at least one arm has vibration characteristics different from those of the other arms.

4 Claims, 5 Drawing Sheets

(56) References Cited

U.S. PATENT DOCUMENTS

| | | |
|---|---|---|
| 8,345,387 B1 | 1/2013 | Nguyen |
| 10,192,575 B1 | 1/2019 | Resh |
| 11,017,803 B1 | 5/2021 | Yoshikawa et al. |
| 11,341,997 B2 | 5/2022 | Tokizaki |
| 11,527,262 B2 | 12/2022 | Okamoto |
| 11,710,507 B2 * | 7/2023 | Tokizaki .............. G11B 5/4813 360/234 |
| 2002/0039259 A1 | 4/2002 | Koyama et al. |
| 2005/0152070 A1 | 7/2005 | Funabashi et al. |
| 2009/0002894 A1 * | 1/2009 | Kerner ................. G11B 5/5526 360/265.9 |
| 2011/0211280 A1 | 9/2011 | Chen et al. |
| 2013/0155547 A1 | 6/2013 | Eguchi et al. |
| 2020/0302958 A1 * | 9/2020 | Hayasaka ............ G11B 5/4813 |
| 2020/0302960 A1 * | 9/2020 | Tokuda ................ G11B 25/043 |
| 2022/0262394 A1 * | 8/2022 | Okamoto ............. G11B 5/4833 |

FOREIGN PATENT DOCUMENTS

| | | |
|---|---|---|
| JP | 2022-049451 A | 3/2022 |
| JP | 2022-125632 A | 8/2022 |

* cited by examiner

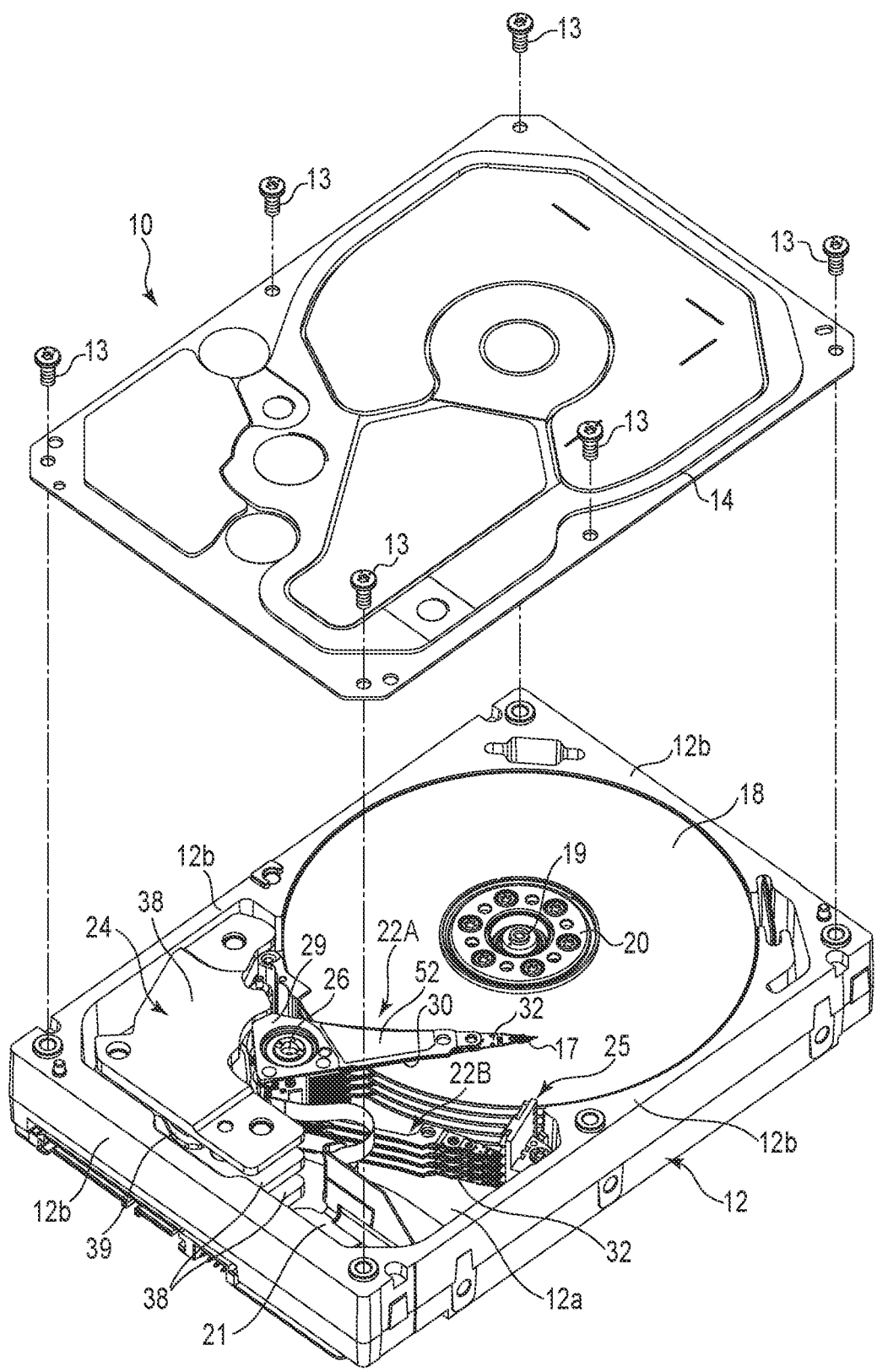
F I G. 1

DISK DEVICE WITH DAMPER ATTACHED TO ARM OF ACTUATOR ASSEMBLY

CROSS-REFERENCE TO RELATED APPLICATIONS

This application is a continuation of U.S. patent application Ser. No. 17/716,596, filed on Apr. 8, 2022, which is a continuation of U.S. patent application Ser. No. 17/180,533, filed on Feb. 19, 2021, now U.S. Pat. No. 11,341,997, issued on May 24, 2022, which is based upon and claims the benefit of priority from Japanese Patent Application No. 2020-155669, filed on Sep. 16, 2020, the entire contents of each of which are incorporated herein by reference.

FIELD

Embodiments described herein relate generally to a disk drive.

BACKGROUND

As a disk drive, for example, a hard disk drive (HDD) comprises a magnetic disk installed in a housing, a spindle motor which supports and drives to rotate the magnetic disk, a head actuator which supports the magnetic head, a voice coil motor which drives the head actuator and the like. The head actuator comprises an actuator block including a plurality of arms and a suspension assembly (which may be referred to as a head gimbal assembly (HGA)) attached to each arm to support the magnetic head.

Recently, as the storage capacity of the HDD increases, the number of magnetic disks installed is increasing accordingly. In order to deal with a number of magnetic disks, the so-called split actuator has been proposed, in which a head actuator is split into a plurality of, for example, two head actuators each independently rotatable and the two head actuators are disposed in a multilayered fashion.

BRIEF DESCRIPTION OF THE DRAWINGS

FIG. 1 is an exploded perspective view of a hard disk drive (HDD) according to a first embodiment diagram, when a top cover is removed.

DETAILED DESCRIPTION

Figure 2:
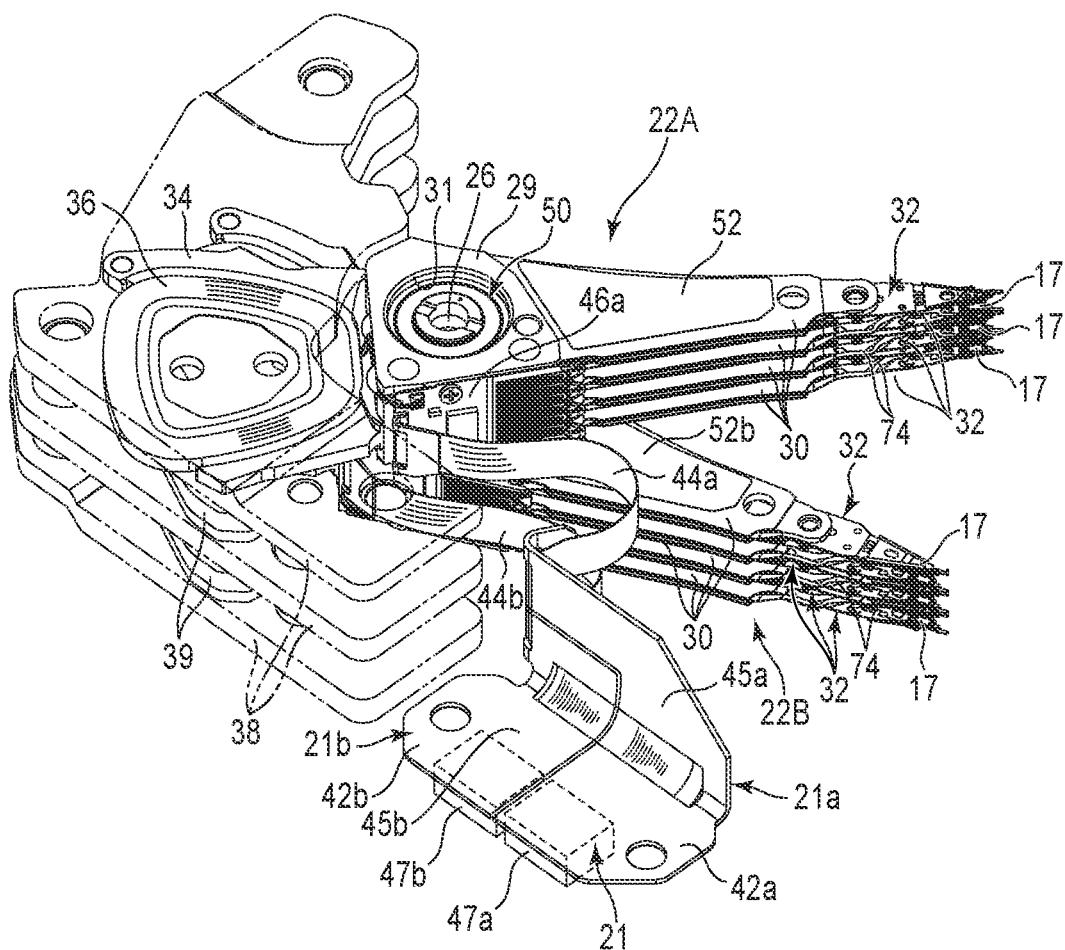
FIG. 2 is a perspective view showing an actuator assembly and a wiring substrate unit of the HDD.

Various embodiments will be described hereinafter with reference to the accompanying drawings.

In general, according to one embodiment, a disk device comprises a plurality of disk-shaped recording media each including a recording layer and an actuator assembly comprising an actuator block rotatably supported around a rotation shaft, a plurality of arms extending from the actuator block, and suspension assemblies respectively attached to the arms and supporting the respective magnetic heads. Of the plurality of arms, at least one arm has vibration characteristics different from those of the other arms.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, the same elements as those described in connection with preceding drawings are denoted by like reference numbers, and detailed description thereof is omitted unless necessary.

First Embodiment

As a disk drive, a hard disk drive (HDD) according to a first embodiment will be described in detail.

FIG. 1 is an exploded perspective view of the HDD according to the first embodiment, when a top cover thereof is removed. The HDD comprises a flat and substantially rectangular housing 10. The housing 10 includes a rectangular box-shaped base 12 with an upper opening, and a top cover 14. The base 12 includes a rectangular bottom wall 12a opposing the top cover 14 with an interval therebetween, and side walls 12b set to stand along circumferential edges of the bottom wall 12a, which are formed to be integrated as one body from, for example, aluminum. The top cover 14 is formed into a rectangular plate shape of, for example, stainless steel. The top cover 14 is screwed to the side walls 12b of the base 12 by a plurality of screws 13 so as to close the upper opening of the base 12.

In the housing 10 are provided a plurality of, for example, six magnetic disks 18 as recording media and a spindle motor 19 as a drive unit which supports and rotates the magnetic disks 18. The spindle motor 19 is disposed on the bottom wall 12a. Each magnetic disk 18 is formed to have, for example, a diameter of 96 mm (approximately, 3.5 inches), and comprises a magnetic recording layer(s) on upper and/or lower surfaces. The magnetic disks 18 are engaged with a hub (not shown) of the spindle motor 19 so as to be coaxial with each other and are clamped by a clamp spring 20 so as to be fixed to the hub. For example, the six magnetic disks 18 are placed parallel to each other in a multilayered manner with intervals therebetween. Further, the magnetic disks 18 are supported so as to be located parallel to the bottom wall 12a of the base 12. The magnetic disks 18 are rotated at a predetermined number of revolutions by the spindle motor 19.

Note that the number of magnetic disks 18 is not limited to six, but it may be increased or decreased.

The housing 10 includes therein a plurality of magnetic heads 17 which performs recording and reproduction of data with respective to the magnetic disks 18, respectively and a head actuator assembly (which may be referred to as a head actuator) which supports the magnetic heads 17 movably with respect to the respective magnetic disks 18. In this embodiment, the head actuator assembly is configured as split actuator assembly divided into a plurality of actuator assemblies, that is, for example, a first actuator assembly 22A and a second actuator assembly 22B. The first and second actuator assemblies 22A and 22B are rotatably supported around a common support shaft (a rotation shaft) 26 standing on the bottom wall 12a of the base 12.

In the housing 10 are provided a voice coil motor (VCM) 24 which pivots and positions the first and second actuator assemblies 22A and 22B, a ramp load mechanism 25 which holds the magnetic heads 17 in an unload position spaced away from a respective magnetic disk 18 when the magnetic heads 17 move to an outermost circumference of the magnetic disk 18, and a wiring substrate unit (FPC unit) 21, on which electronic components such as conversion connectors are mounted.

On an outer surface of the bottom wall 12a, a printed circuit board (not shown) is fixed by screwing. The printed circuit board constitutes a controller, and the controller controls operation of the spindle motor 19 and controls operation of the VCM 24 and the magnetic heads 17 via the wiring substrate unit 21.

Figure 3:
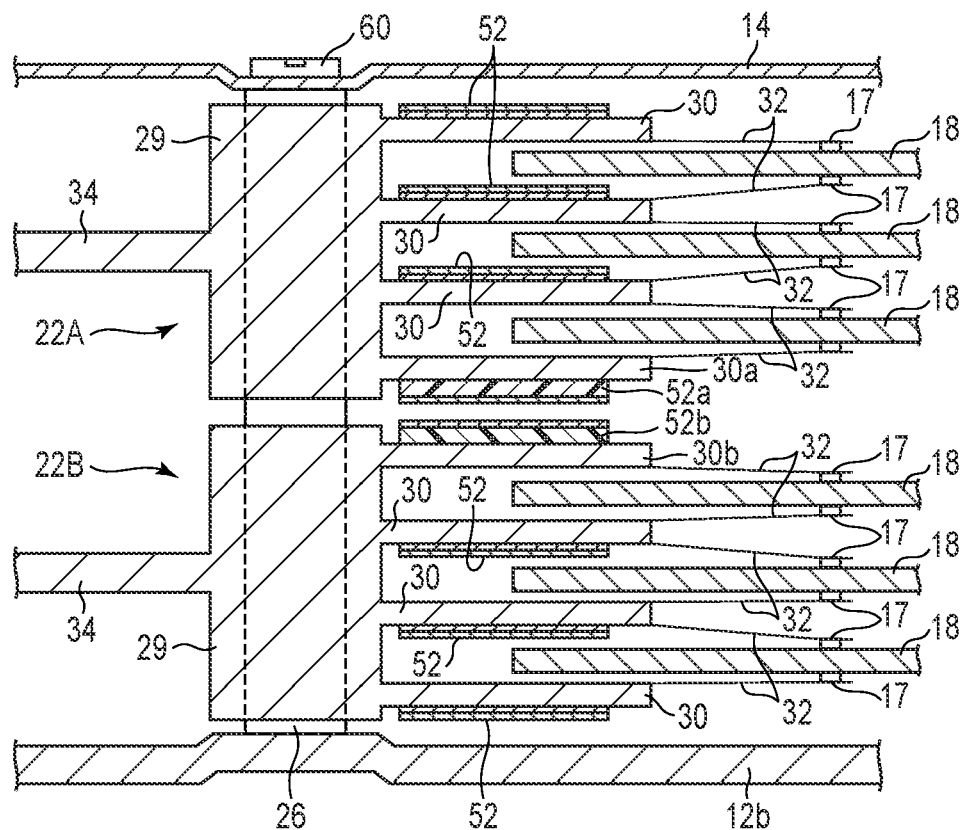
FIG. 3 is a cross-sectional view of actuator assemblies which is in a state.

FIG. 2 is a perspective diagram showing the split actuator assemblies and the wiring substrate unit, and FIG. 3 is a cross-sectional view of the split actuator assemblies in order.

As shown in FIGS. 2 and 3, the split actuator assembly includes the first actuator assembly 22A and the second actuator assembly 22B. The first and second actuator assemblies 22A and 22B are disposed in a multilayered manner one above another, and are provided to be rotatable independently from each other around the common support shaft 26 standing on the bottom wall 12a of the base 12. The first actuator assembly 22A and the second actuator assembly 22B are configured to have structures substantially identical to each other. For example, the upper actuator assembly is referred to the first actuator assembly 22A, and the lower actuator assembly is the second actuator assembly 22B.

The first actuator assembly 22A comprises an actuator block (a first actuator block) 29, four arms 30 extending from the actuator block 29, head suspension assemblies (which may be referred to as head gimbal assemblies (HGAs)) 32 respectively attached to the arms 30, and magnetic heads 17 respectively supported by the head suspension assemblies. The actuator block 29 comprises an inner hole 31, to which a bearing unit (unit bearing) 50 is mounted. The actuator block 29 is supported rotatably on the support shaft 26 by the bearing unit 50.

In this embodiment, the actuator block 29 and the four arms 30 are formed to be integrated as one body from aluminum or the like, and constitute a so-called E block. The arms 30 are each formed into, for example, a slender flat plate shape, and extend from the actuator block 29 in a direction normal to the support shaft 26. The four arms 30 are provided parallel to each other with intervals respectively therebetween each other. In this embodiment, the four arms 30 are formed to have dimensions identical to each other and shapes identical to each other.

The first actuator assembly 22A includes a support frame 34 extending from the actuator block 29 in a direction opposite to the arms 30. A voice coil 36 is supported by the support frame 34. As shown in FIGS. 1 and 2, the voice coil 36 is located between a pair of yokes 38 installed in the base 12 and it constitutes the VCM 24 together with the yokes 38 and a magnet 39 secured to one of the yokes 38.

As shown in FIGS. 2 and 3, the first actuator assembly 22A comprises six head suspension assemblies 32, and the head suspension assemblies 32 are respectively attached to extending ends of the respective arms 30. The head suspension assemblies 32 include up-head suspension assemblies which support the respective magnetic head 17 upward and down-head suspension assemblies which support the respective magnetic head 17 downward. The up-head and down-head suspension assemblies can be formed from head suspension assemblies of the same structure by placing them in different directions up and down. In this embodiment, in the first actuator assembly 22A, a down-head suspension assembly is attached to the uppermost arm 30, and an up-head suspension assembly is provided to the lowermost arm 30 (30a), and two head suspension assemblies of an up-head suspension assembly and a down-head suspension assembly are attached to each of the other two arms 30.

Six head suspension assemblies 32 extend from the four arms 30 and are disposed substantially parallel to each other with regular intervals therebetween respectively each other. Two magnetic heads 17 supported by a pair of a down-head suspension assembly 32 and an up-head suspension assembly 32 are located to face each other with a predetermined interval therebetween. These magnetic heads 17 are located to oppose respective surfaces of the corresponding magnetic disk 18.

As illustrated schematically in FIG. 2, the suspension assemblies 32 each comprise a slender plate spring-shaped suspension (a base plate and a load beam) and a slender belt-shaped flexure (a wiring member) 74. A distal end-side portion of the flexure 74 is attached on surfaces of the load beam and the base plate, and a proximal end-side portion of the flexure 74 extend to a proximal end of the arm 30 along the arm 30. The magnetic head 17 is mounted on a gimbal portion (an elastic support portion) (not shown) provided at the distal end portion of the flexure 74. Wiring lines of the flexure 74 are electrically connected to a read element, a write element, a heater and other members of the magnetic head 17.

The proximal end-side portion of the flexure 74 is joined to a connection portion (a wiring substrate) 46 of the flexible printed-circuit board (FPC), mounted on a mount surface of the actuator block 29.

The second actuator assembly 22B has a structure substantially identical to that of the first actuator assembly 22A. That is, as shown in FIGS. 2 and 3, the second actuator assembly 22B comprises an actuator block (a second actuator block) 29 in which a bearing unit is built, four arms 30 extending from the actuator block 29, six head suspension assemblies 32 respectively attached to the arms 30, magnetic heads 17 mounted on the respective head suspension assemblies and a support frame 34 which supports the voice coil 36.

The actuator block 29 is supported rotatably by the support shaft 26 via the bearing unit. The actuator block (the second actuator block) 29 is supported on a proximal end portion (a half portion on a bottom wall 12a side) of the support shaft 26, and is coaxially placed below the first actuator block 29. The actuator block (the second actuator block) 29 opposes the first actuator block 29 with a slight gap therebetween.

The actuator block 29 and the four arms 30 are formed to be integrated as one body from aluminum or the like, and constitutes the so-called E block. The arms 30 are each formed into, for example, a slender flat plate shape, and extend from the actuator block 29 in a direction normal to the support shaft 26. The four arms 30 are provided parallel to each other with intervals respectively therebetween. In this embodiment, the four arms 30 are formed to have dimensions identical to and shapes identical to those of the arms 30 of the first actuator assembly 22A.

A lowermost arm 30*a* of the first actuator assembly 22A and an uppermost arm 30*b* of the second actuator assembly 22B are located most adjacent to a boundary between the first actuator assembly 22A and the second actuator assembly 22B. The lowermost arm 30*a* and the uppermost arm 30*b* are disposed substantially parallel to each other with a predetermined interval therebetween.

The VCM 24 which drives the first actuator assembly 22A and the VCM 24 which drives the second actuator assembly 22B are provided independent from each other. With this structure, the first actuator assembly 22A and the second actuator assembly 22B can be driven (rotated) independent from each other around the support shaft 26.

As shown in FIGS. 2 and 3, in the first actuator assembly 22A and the second actuator assembly 22B, a damper 52 is attached to each arm 30. In the first actuator assembly 22A, dampers 52 are attached respectively to upper surfaces (upper surfaces facing a top cover 14 side) of the uppermost, second and third arms 30. A damper 52*a* is attached on a lower surface (a surface on a boundary side) of the lowermost arm 30*a*.

In the second actuator assembly 22B, a damper 52*b* is attached on an upper surface (a surface on a boundary side) of the uppermost arm 30*b*, and dampers 52 are respectively attached on lower surfaces (lower surfaces facing the bottom wall 12*a* side) of the second, third and lowermost arms 30.

Figure 4:
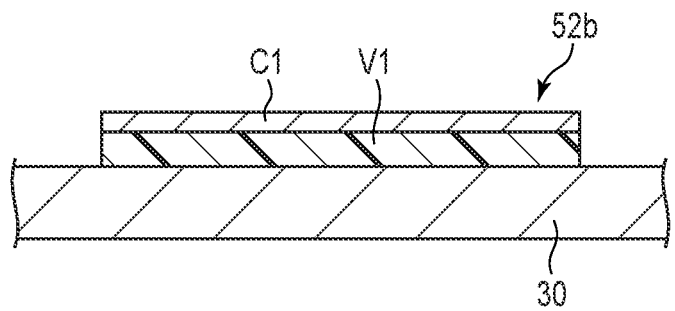
FIG. 4 is a cross-sectional view showing a part of the arm of the actuator assembly and a damper.

FIG. 4 is a cross-sectional view of an example of the damper.

As shown, each of the dampers 52, for example, the damper 52*b* has a double-layered structure of a viscoelastic layer V1 and a constraint layer C1. The viscoelastic layer V1 is made of a viscoelastic material, and the constraint layer C1 is made of, for example, a material having a rigidity higher than that of the viscoelastic layer, that is, stainless steel. The viscoelastic layer V1 and the constraint layer C1 are formed into planar shapes substantially identical to each other and for example, they are formed into planar shapes substantially the same as the planar shape of the arms 30. The damper 52 covers the surface of the respective arm 30 while the viscoelastic layer V1 is attached on the surface of the arm 30. When an arm 30 is deformed by vibration, the viscoelastic layer V1 between the arm 30 and the constraint layer C1 is warped, thereby creating a vibration damping effect. Usually, as the thickness of the damper is greater or the plane area of the damper is greater, the damping effect is enhanced.

As described above, in the actuator assemblies configured as described above, at least one arm 30 has vibration characteristics different from those of the other arms 30. According to this embodiment, as shown in FIG. 3, in the first actuator assembly 22A, the damper 52*a* attached to the lowermost arm 30*a* (the arm most adjacent to the second actuator assembly 22B) is formed thicker than the other dampers 52 respectively attached on the other arms 30. For example, when the thickness of the viscoelastic layer V1 of the dampers 52 is 50 μm and the thickness of the constraint layers C1 is 50 μm, the thickness of the viscoelastic layer V1 of the damper 52*a* is set to 80 to 100 μm, and the thickness of constraint layers C1 is 50 μm. Therefore, the damper 52*a* can exhibits a vibration damping effect higher than that of the other dampers 52. Thus, the lowermost arm 30*a* on which the damper 52*a* is attached, that is, the arm 30*a* adjacent to the boundary between the actuator assemblies 22A and 22B has vibration characteristics different from those of the other arms 30. Since the vibration damping effect is higher in the damper 52*a* than in the other dampers 52, and therefore the arm 30*a* can reduce the generated vibration as compared to the other arms 30.

Note that in order to enhance the vibration damping characteristics of the damper 52*a*, the constraint layer C1 thereof may be formed thicker than the constraint layers of the other dampers 52 in place of thickening the viscoelastic layer V1.

Alternatively, both the thickness of the viscoelastic layer V1 and the thickness of the constraint layer C1 of the damper 52*a* may be set greater than the thickness of the other dampers 52. Further, by using a material of the viscoelastic layer V1 or the constraint layer C1 of the damper 52*a*, different from that of the material of the damper 52, the vibration damping effect can be further enhanced.

In the second actuator assembly 22B, the damper 52*b* attached to the uppermost arm 30*b* (the arm most adjacent to the first actuator assembly 22A) is formed thicker than the other dampers 52 respectively attached onto the other arms 30. For example, when the thickness of the viscoelastic layer V1 of the dampers 52 is 50 μm and the thickness of the constraint layers C1 is 50 μm, the thickness of the viscoelastic layer V1 of the damper 52*b* is set to 80 to 100 μm, and the thickness of constraint layers C1 is 50 μm. Therefore, the damper 52*b* can exhibits a vibration damping effect higher than that of the other dampers 52. Thus, the uppermost arm 30*b* on which the damper 52*b* is attached, that is, the arm 30*b* adjacent to the boundary between the actuator assemblies 22A and 22B has vibration characteristics different from those of the other arms 30. Since the vibration damping effect is higher in the damper 52*b* than in the other dampers 52, and therefore the arm 30*b* can reduce the generated vibration as compared to the other arms 30.

As shown in FIG. 2, the FPC unit 21 includes a first FPC unit 21*a* connected to the first actuator assembly 22A and a second FPC unit 21*b* connected to the second actuator assembly 22B.

The first FPC unit 21*a* includes a substantially rectangular base portion 42*a*, a belt-like relay portion 44*a* extending from one side edge of the base portion 42*a*, and a junction (a first wiring substrate) 46*a* continuously provided onto a distal end of the relay portion 44*a*, which are integrated as one body. The base portion 42*a*, the relay portion 44*a* and the junction 46*a* are formed from a flexible printed-circuit board (FPC). The flexible printed-circuit board includes an insulator layer such as of polyimide or the like, a conducting layer formed on the insulating layer, which forms wiring lines, contact pads and the like and a protective layer which covers the conducting layer.

On the base portion 42*a*, electronic components including a conversion connector 47*a* and a plurality of capacitors (not shown) and the like are mounted and are electrically connected to the wiring lines of the FPC. To the base portion 42*a*, a metal band 45*a* is attached, which functions as a reinforcing plate. The metal band 45*a* and the base portion 42*a* are each bent into substantially an L shape. The base portion 42*a* is disposed on the bottom wall 12*a* of the base 12. The relay portion 44*a* extends from a side edge of the base portion 42*a* towards the first actuator assembly 22A. The junction 46*a* provided in the extending end of the relay portion 44*a* is attached onto one side surface (installation surface) of the first actuator block 29, and further fixed by screwing onto the installation surface by a fixing screw.

A connecting end portion of each flexure 74 is disposed to overlay on the junction 46*a* and is electrically and mechanically joined to the junction 46*a*. Thus, the six magnetic heads 17 of the first actuator assembly 22A are electrically connected to the base portion 42*a* via the wiring lines of the flexure 74, the junction 46a of the first FPC unit 21a and the relay portion 44a, respectively. Further, the base portion 42a is electrically connected to the printed circuit board on a bottom surface side of the housing 10 via the conversion connector 47a.

Similarly, the second FPC unit 21b includes a substantially rectangular base portion 42b, a belt-like relay portion 44b extending from one side edge of the base portion 42b, and a junction (not shown) continuously provided onto a distal end of the relay portion 44b, which are integrated as one body. The base portion 42b, the relay portion 44b and the junction are formed from a flexible printed-circuit board (FPC).

On the base portion 42b, electronic components including the conversion connector 47b, capacitors (not shown) and the like are mounted and are electrically connected to the wiring lines of the FPC. The base portion 42b is disposed to be adjacent to and in order with the base portion 42a of the first FPC unit 21a and is installed on the bottom wall 12a of the base 12. The relay portion 44b extends from a side edge of the base portion 42b towards the second actuator assembly 22B. The junction formed at the extending end of the relay portion 44b is attached onto one side surface (installation surface) of the second actuator block 29, and further fixed by screwing to the installation surface with fixing screws.

The connecting end portion of each flexure 74 is disposed to be overlaid on the junction so as to be electrically and mechanically joined to the junction. Thus, the six magnetic heads 17 of the second actuator assembly 22B are electrically connected to the base portion 42b via the wiring lines of the flexure 74, the junction of the second FPC unit 21a and the relay portion 44b, respectively. Furthermore, the base portion 42b is electrically connected to the printed circuit board on a bottom surface side of the housing 10 via the conversion connector 47b.

In the split actuator assembly configured as described above, the vibration of the first actuator assembly 22A and the vibration of the second actuator assembly 22B may interfere with each other via the support shaft 26. When such an interaction occurs, the vibrational response in the vicinity of an axial central portion of the support shaft 26 increases.

To avoid this, in the HDD of this embodiment, thick dampers 52a and 52b are attached to the vicinity of the axial center of the support shaft 26, more specifically, on the arm 30a and the arm 30b located near the boundary between the first actuator assembly 22A and the second actuator assembly 22B. With this structure, if vibration occurs near the axial central portion of the support shaft 26, the vibration of the arms 30a and 30b can be effectively reduced. Thus, the contact between the arms 30a and 30b and the respective magnetic disk 18 can be prevented, making it possible to improve the reliability.

Between the arm 30a and arm 30b, a magnetic disk 18 is not located, and therefore even if the thickness of the dampers 52a and 52b is increased, the dampers do not approach a magnetic disk. With this structure, the contact between the dampers 52a and 52b and the respective magnetic disk 18 can be prevented, thereby making it possible to improve the reliability.

As described above, according to the first embodiment, the vibration of the arms of the head actuators can be restrained, and thus a disk drive with an improved reliability cab be obtained.

Next, HDDs according to other embodiments will be described. In the other embodiments to be described below, portions equivalent to those of the first embodiment are denoted by the same reference numbers and detailed explanation is omitted or simplified, such explanation being mainly given to portions different from those of the first embodiment.

Second Embodiment

Figure 5:
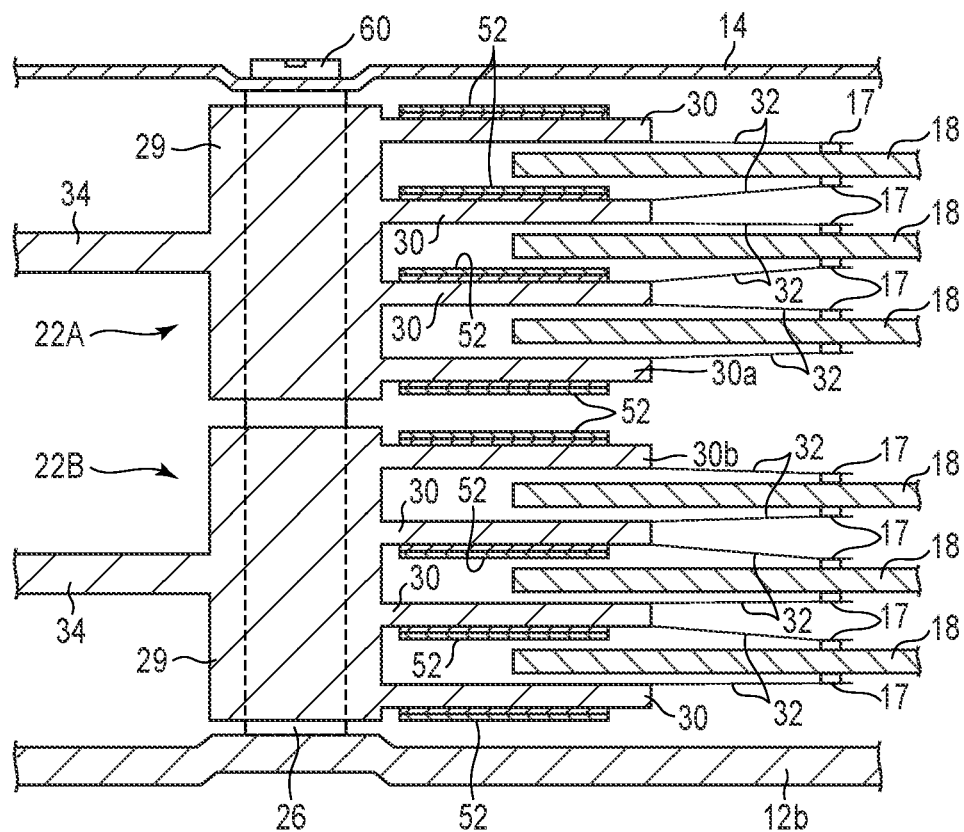
FIG. 5 is a cross-sectional view schematically showing an actuator assembly of a HDD according to a second embodiment.
Figure 6:
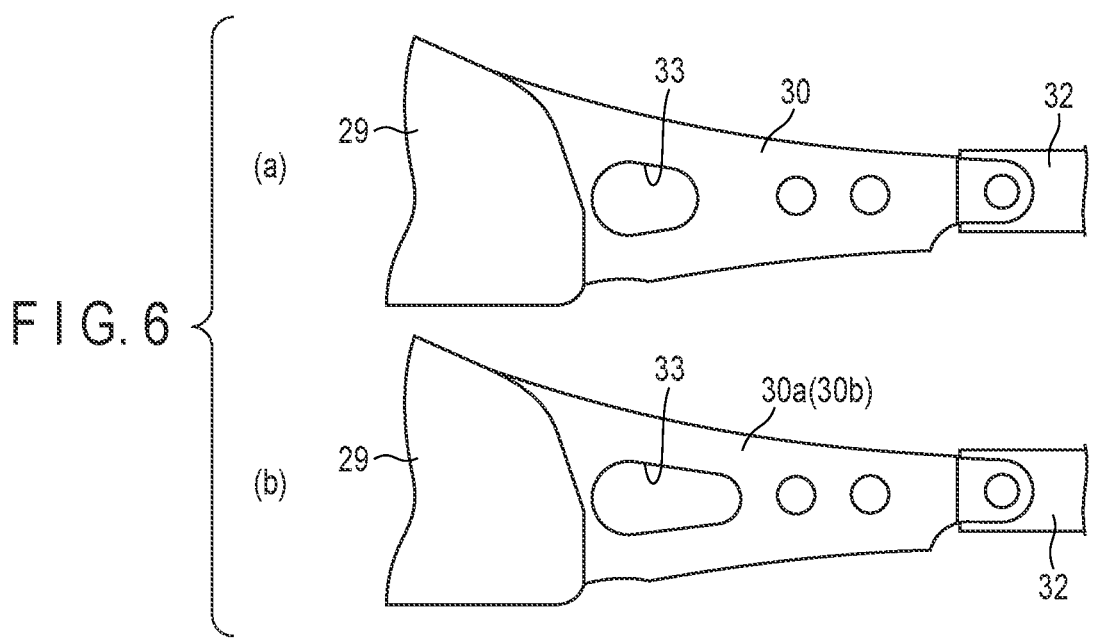
FIG. 6 is a plan view schematically showing arms of the actuator assembly in the second embodiment.

FIG. 5 is a cross-sectional view schematically showing an actuator assembly of an HDD according to a second embodiment, and FIG. 6 is a plan view schematically showing arms of the actuator assembly in the second embodiment.

As shown in FIG. 5, according to the second embodiment, dampers 52 respectively attached to four arms 30 and 30a of a first actuator assembly 22A are all formed to have the same thickness. Dampers 52 attached to four arms 30 and 30b of a second actuator assembly 22B are all formed to have the same thickness.

In the actuator assembly, at least one arm 30 has vibration characteristics different from those of the other arms 30. According to this embodiment, in the first actuator assembly 22A, a lowermost arm 30a is formed into a shape different from that of the other three arms 30. FIG. 6, in part (a), shows a planar shape of the three arms 30 on an upper side. Each of these arms 30 is formed into a slender flat plate shape and comprises a plurality of through holes including a first through hole 33. FIG. 6, in part (b), shows a planar shape of the lowermost arm 30a. The arm 30a is formed into a slender flat plate shape, and comprises a plurality of through holes including the first through hole 33. Here, the first through hole 33 of the arm 30a is greater in open area than the first through holes 33 of the other arms 30. That is, the arm 30a has a plane area less than that of the other arms 30, and a mass less than that of the other arms 30. Thus, the lowermost arm 30a has vibration characteristics different from those of the other arms 30. The arm 30a is formed to exhibit a characteristic frequency different from that of the other arms 30.

In the second actuator assembly 22B, an uppermost arm 30b is formed into a shape different from that of the other three arms 30. FIG. 6, in part (a), shows a planar shape of the three arms 30 on a lower side. Each of these arms 30 is formed into a slender flat plate shape and comprises a plurality of through holes including a first through hole 33. FIG. 6, in part (b), shows a planar shape of the uppermost arm 30b. The arm 30b is formed into a slender flat plate shape, and comprises a plurality of through holes including the first through hole 33. Here, the first through hole 33 of the arm 30b is greater in open area than the first through holes 33 of the other arms 30. That is, the arm 30b has a plane area less than that of the other arms 30, and a mass less than that of the other arms 30. Thus, the lowermost arm 30b has vibration characteristics different from those of the other arms 30. The arm 30b is formed to exhibit a characteristic frequency different from that of the other arms 30.

In the second embodiment, the other configuration of the HDD is the same as that of the HDD according to the first embodiment previously described.

According to the actuator assembly of the HDD configured as described above, if vibration occurs near the axial central portion of the support shaft 26, the vibration can be attenuated by adjusting the characteristic frequency of each of the arms 30a and 30b located near the axial center of the support shaft 26, that is, near the boundary between the first actuator assembly 22A and the second actuator assembly 22B. Thus, the contact between the arms 30a and 30b and the respective magnetic disk 18 can be prevented, making it possible to improve the reliability.

Note that the arms are not limited to the above-described configuration that they are different in the shape and size of the first through holes, but may be of such a configuration that the arms are different in outer shape and thickness.

Third Embodiment

Figure 7:
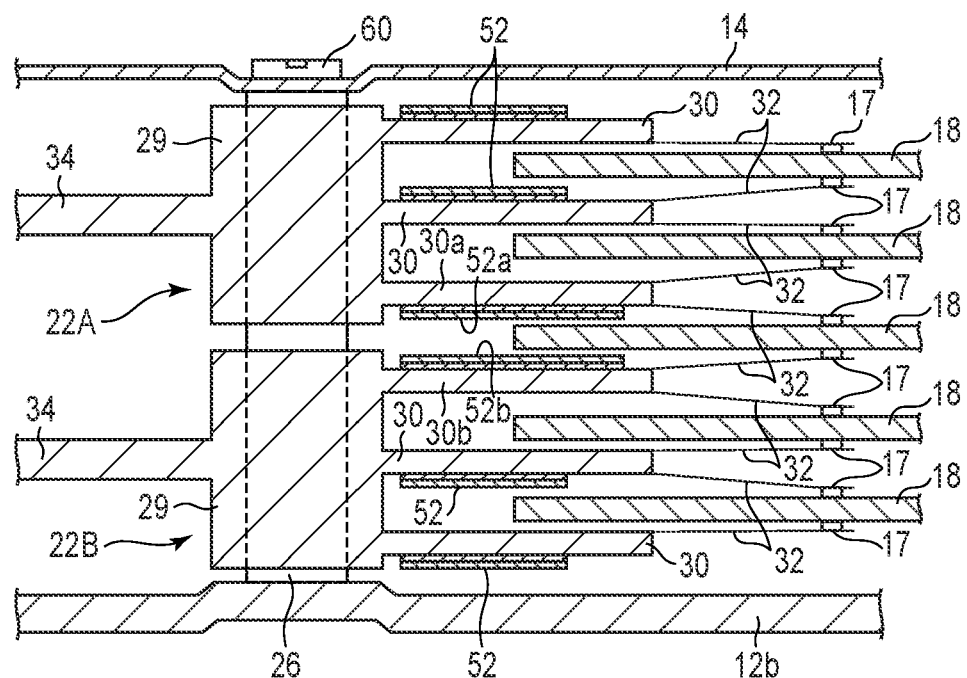
FIG. 7 is a cross-sectional view schematically showing an actuator assembly of a HDD according to a third embodiment.

FIG. 7 is a cross sectional view schematically showing an actuator assembly of an HDD according to a third embodiment.

For increasing the vibration damping characteristics of a damper, the plane area of the damper can be set greater than that of the other dampers in place of increasing the thickness of the damper. In the third embodiment, the dampers provided in at least one arm are formed to have a plane area greater than the plane areas of the dampers of the other arms.

As shown in FIG. 7, the HDD of the third embodiment includes an odd number of, for example, five magnetic disks 18. The split actuator assembly includes a first actuator assembly 22A and a second actuator assembly 22B. The first and second actuator assemblies 22A and 22B are disposed in a multilayered manner one above another, and are provided to be rotatable independently from each other around the common support shaft 26 standing on the bottom wall 12a of the base 12. The first actuator assembly 22A and the second actuator assembly 22B are configured to have structures substantially identical to each other.

The first actuator assembly 22A disposed on an upper side comprises an actuator block (a first actuator block) 29, three arms 30 extending from the actuator block 29, head suspension assemblies 32 respectively attached to the arms 30, and magnetic heads 17 respectively supported by the head suspension assemblies.

The actuator block 29 and the three arms 30 are formed to be integrated as one body from aluminum or the like, and constitute the so-called E block. The arms 30 are each formed into, for example, a slender flat plate shape, and extend from the actuator block 29 along a direction normal to the support shaft 26. The three arms 30 are provided parallel to each other with intervals respectively therebetween each other. In this embodiment, the three arms 30 are formed to have dimensions identical to each other and shapes identical to each other.

In this embodiment, in the first actuator assembly 22A, a down-head suspension assembly is attached to the uppermost arm 30, and two head suspension assemblies, namely, an up-head suspension assembly and a down-head suspension assembly are attached to each of the middle arms 30 and the lowermost arm 30a.

The second actuator assembly 22B disposed on a lower side comprises an actuator block (a second actuator block) 29, three arms 30 extending from the actuator block 29, five head suspension assemblies 32 respectively attached to the arms 30, magnetic heads 17 mounted on the respective head suspension assemblies and a support frame 34 which supports the voice coil.

The actuator block 29 is supported pivotably by the support shaft 26 via a bearing unit. The actuator block (the second actuator block) 29 is supported by a proximal end portion (a half portion on a bottom wall 12a side) of the support shaft 26, and is coaxially placed below the first actuator block 29. The actuator block (the second actuator block) 29 opposes the first actuator block 29 with a slight gap therebetween.

The actuator block 29 and the three arms 30 are formed to be integrated as one body from aluminum or the like, and constitutes the so-called E block. The arms 30 are each formed into, for example, a slender flat plate shape, and extend from the actuator block 29 in a direction normal to the support shaft 26. The three arms 30 are provided parallel to each other with intervals respectively therebetween. In this embodiment, the three arms 30 are formed to have dimensions identical to and shapes identical to those of the arms 30 of the first actuator assembly 22A.

A lowermost arm 30a of the first actuator assembly 22A and an uppermost arm 30b of the second actuator assembly 22B are located most adjacent to a boundary between the first actuator assembly 22A and the second actuator assembly 22B. The lowermost arm 30a and the uppermost arm 30b are disposed substantially parallel to each other with a predetermined interval therebetween.

In this embodiment, in the second actuator assembly 22B, an up-head suspension assembly is attached to the lowermost arm 30, and two head suspension assemblies, namely, an up-head suspension assembly and a down-head suspension assembly are attached to each of the middle arms 30 and the uppermost arm 30b.

In the first actuator assembly 22A and the second actuator assembly 22B, ten head suspension assemblies 32 extend respectively from six arms 30 and are placed substantially parallel to each other with predetermined intervals respectively therebetween. Two magnetic heads 17 supported by a pair of a down-head suspension assembly 32 and an up-head suspension assembly 32 are located to face each other with a predetermined interval therebetween. These magnetic heads 17 are located to oppose respective surfaces of the corresponding magnetic disk 18.

When there are an odd number of magnetic disks 18 are installed, the magnetic disk 18 located exactly in the middle along their stacking direction is placed between the lowermost arm 30a of the first actuator assembly 22A and the uppermost arm 30b of the second actuator assembly 22B. Therefore, the magnetic head 17 of the down-head suspension assembly 32 attached to the lowermost arm 30a and the magnetic head 17 of the up-head suspension assembly 32 attached to the uppermost arm 30b are located to oppose respective surfaces of the central magnetic disk 18.

The first actuator assembly 22A and the second actuator assembly 22B can be independently driven (pivoted) around the support shaft 26.

In the first actuator assembly 22A and the second actuator assembly 22B, a damper 52 is attached to each arm 30. In the first actuator assembly 22A, dampers 52 are attached respectively to upper surfaces (upper surfaces facing a top cover 14 side) of two arms, that is, the uppermost and the middle arms 30. A damper 52a is attached on a lower surface (a surface on a boundary side) of the lowermost arm 30a.

In the second actuator assembly 22B, a damper 52b is attached on an upper surface (a surface on a boundary side) of the uppermost arm 30b, and dampers 52 are respectively attached on lower surfaces (lower surfaces facing the bottom wall 12a side) of two arms, the middle and the lowermost arms 30.

In the actuator assemblies configured as above, at least one arm 30 has vibration characteristics different from those of the other arms 30. According to this embodiment, in the first actuator assembly 22A, the damper 52a attached to the lowermost arm 30a (the arm most adjacent to the second actuator assembly 22B) is formed to have a plane area greater than the other dampers 52 respectively attached on the other arms 30. For example, the damper 52a is formed to have a length along the extending direction of the arm 30, greater than the length of the other dampers 52, and a plane area greater than that of the other dampers 52. Note that the dampers 52 and 52*a* are set to have the same thickness.

The damper 52*a*, with its larger plane area, can exhibit a vibration damping effect higher than that of the other dampers 52. Thus, the lowermost arm 30*a* on which the damper 52*a* is attached has vibration characteristics different from those of the other arms 30. The damper 52*a* has a vibration damping effect higher than that of the other dampers 52, and thus the arm 30*a* exhibits can be effectively reduced as compared to the other arms 30.

In the first actuator assembly 22A, the damper 52*b* attached to the uppermost arm 30*b* (the arm most adjacent to the first actuator assembly 22A) is formed to have a plane area greater than the other dampers 52 respectively attached on the other arms 30. For example, the damper 52*b* is formed to have a length along the extending direction of the arm 30, greater than the length of the other dampers 52, and a plane area greater than that of the other dampers 52. Note that the dampers 52 and 52*b* are set to have the same thickness.

The damper 52*a*, with its larger plane area, can exhibit a vibration damping effect higher than that of the other dampers 52. Thus, the uppermost arm 30*b* on which the damper 52*b* is attached has vibration characteristics different from those of the other arms 30. The damper 52*b* has a vibration damping effect higher than that of the other dampers 52, and thus the arm 30*a* exhibits can be effectively reduced as compared to the other arms 30.

In the third embodiment, the other configurations of the actuator assembly and the HDD are the same as those of the HDD according to the first embodiment previously described.

According to the actuator assembly of the HDD configured as described above, if vibration occurs near the axial central portion of the support shaft 26, the vibration of each of the arms 30*a* and 30*b* located near the axial center of the support shaft 26, that is, near the boundary between the first actuator assembly 22A and the second actuator assembly 22B can be attenuated. Thus, the contact between the arms 30*a* and 30*b* and the respective magnetic disk 18 can be prevented, making it possible to improve the reliability.

When there are an odd number of magnetic disks 18 are installed, the magnetic disk 18 located exactly in the middle is placed between the arm 30*a* and the arm 30*b*. In this case, the dampers 52*a* and 52*b* attached to the arms 30*a* and 30*b* approach close to the respective magnetic disk 18, thus making it difficult to increase the thickness of the dampers 52*a* and 52*b*. On the other hand, in this embodiment, the plane area of the dampers 52*a* and 52*b* can be set greater in place of increasing the thickness of the dampers. Thus, the vibration damping effect can be improved while preventing contact between the dampers 52*a*, 52*b* and the respective magnetic disk 18.

As described above, according to the third embodiment, the vibration of the arms of the head actuators can be restrained, and thus a disk drive with an improved reliability cab be obtained.

Fourth Embodiment

Figure 8:
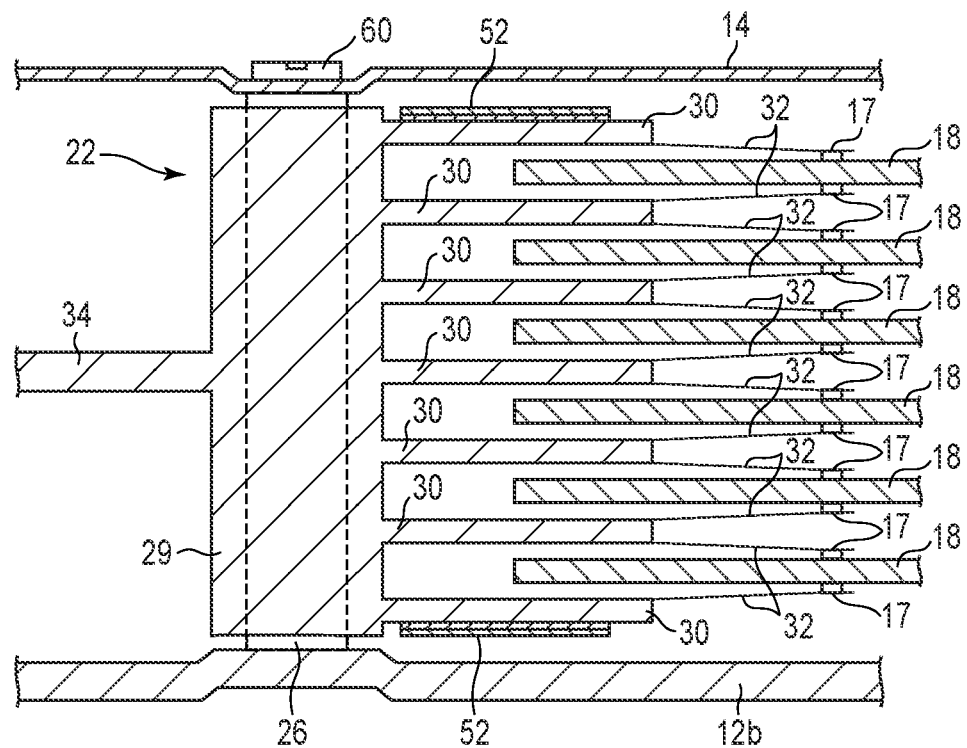
FIG. 8 is a cross-sectional view schematically an actuator assembly of a HDD according to a fourth embodiment.

FIG. 8 is a cross-sectional view schematically showing an actuator assembly of an HDD according to a fourth embodiment.

As shown, according to the fourth embodiment, an actuator assembly 22 of the HDD is configured as a single actuator assembly. The actuator assembly 22 comprises an actuator block 29 rotatably supported by a support shaft 26 via a bearing unit (not shown), seven arms 30 extending from the actuator block 29, head suspension assemblies 32 attached to the respective arms 30, and magnetic heads 17 supported by the respective head suspension assemblies.

The actuator block 29 and the seven arms 30 are formed to be integrated as one body from aluminum or the like, and constitute the so-called E block. The arms 30 are each formed into, for example, a slender flat plate shape, and extend from the actuator block 29 along a direction normal to the support shaft 26. The seven arms 30 are provided parallel to each other with intervals respectively therebetween each other. In this embodiment, the seven arms 30 are formed to have dimensions identical to each other and shapes identical to each other.

The actuator assembly 22 comprises a support frame 34 extending from the actuator block 29 in a direction opposite to the arms 30. A voice coil (not shown) which constitutes the VCM is supported on the support frame 34.

The actuator assembly 22 comprises twelve head suspension assemblies 32, and the head suspension assemblies 32 are attached respectively to extending ends of the arms 30. In the actuator assembly 22, a down-head suspension assembly 32 is attached to an uppermost arm 30, and an up-head suspension assembly 32 is provided at a lowermost arm 30, and two head suspension assemblies, namely, the up-head suspension assembly 32 and the down-head suspension assembly 32 are attached to each of the other five arms 30.

Two magnetic heads 17 supported by a pair of a down-head suspension assembly 32 and an up-head suspension assembly 32 are located to face each other with a predetermined interval therebetween. The magnetic heads 17 are located to oppose respective surface of the corresponding magnetic disk 18.

In the actuator assembly 22 configured as described above, at least one arm 30 has vibration characteristics different from those of the other arms 30. According to this embodiment, in the actuator assembly, a damper 52 is attached on an upper surface (a surface facing the top cover 14) of the uppermost arm, and a damper 52 is attached on a lower surface (a surface facing the bottom wall 12*a* side) of the lowermost arm 30.

As in the first embodiment described above, the dampers 52 have a double-layered structure of a viscoelastic layer and a constraint layer. The viscoelastic layer is made of a viscoelastic material, and the constraint layer is made of, for example, a material having a rigidity higher than that of the viscoelastic layer, that is, stainless steel. The viscoelastic layer and the constraint layer are formed into planar shapes substantially identical to each other and for example, they are formed into planar shapes substantially the same as the planar shape of the arms 30. The damper 52 covers the surface of the respective arm 30 while the viscoelastic layer is attached on the surface of the arm 30. When an arm 30 is deformed by vibration, the viscoelastic layer between the arm 30 and the constraint layer is warped, thereby creating a vibration damping effect.

As described above, the dampers 52 is attached respectively on the uppermost arm 30 and the lowermost arm 30, these arms have vibration characteristics different from those of the other arms 30. That is, due to the vibration damping effect of the dampers 52, the uppermost and lowermost arms 30 attenuate the vibration occurred, as compared to the other arms 30.

When an external impact or the like applied on the HDD, the vibration of the uppermost arm and the lowermost arm of the actuator assembly 22 can be suppressed, thereby making it possible to prevent collision between the respective arm 30 and the top cover 14, collision between the respective arm 30 and the bottom wall 12a and contact between the arm 30 and the magnetic disk 18. As described above, in the third embodiment as well, the vibration of the arm of the actuator assembly is restrained, and thus a disk drive with improved reliability can be obtained.

Note that the structure in which the arms have different vibration characteristics is not limited to the case where dampers are attached, but such a configuration will do that arms are formed to have a shape different from the shape of the other arms.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The head actuator assembly can be divided into not only two, that is, the first and second actuator assemblies, but also three or more. The number of magnetic disks is not limited to six, but it may be five or less, or seven or more. The number of arms, that of head suspension assemblies, and the number of magnetic heads may be increased and decreased according to the number of magnetic disks installed.

The arms of different vibration characteristics are not limited to the uppermost and lowermost arms, but any other arms can be selected. The material, shape, size and the like of the elements which constitute the disk drive are not limited those of the embodiments, but they may be changed in various ways as needed.

What is claimed is:

1. A disk device comprising:
 a plurality of disk-shaped recording media, each comprising a recording layer;
 a first actuator assembly comprising a first actuator block rotatably supported around a rotation shaft, a plurality of first arms extending from the first actuator block, and a plurality of first suspension assemblies respectively attached to the plurality of first arms and respectively supporting a plurality of first magnetic heads; and
 a second actuator assembly comprising a second actuator block rotatably supported around the rotation shaft, the second actuator block opposing the first actuator block with an interval therebetween, a plurality of second arms extending from the second actuator block, and a plurality of second suspension assemblies respectively attached to the plurality of second arms and respectively supporting a plurality of second magnetic heads,
 wherein the first arm which is closest to the second actuator assembly of all the first arms has vibration characteristics different from those of each one of the other first arms, and
 the second arm which is closest to the first actuator assembly of all the second arms has vibration characteristics different from those of each one of the other second arms.

2. The device of claim 1, wherein
 the first arm which is closest to the second actuator assembly has a shape different from that of each one of the other first arms, and
 the second arm which is closest to the first actuator assembly has a shape different from that of each one of the other second arms.

3. The device of claim 1, wherein
 the first arm which is closest to the second actuator assembly has a plane area less than a plane area of each one of the other first arms, and
 the second arm which is closest to the first actuator assembly has a plane area less than a plane area of each one of the other second arms.

4. The device of claim 1, which further comprises a damper provided on the first arm which is closest to the second actuator assembly.

* * * * *